US007222744B2

(12) United States Patent
Magyar

(10) Patent No.: US 7,222,744 B2
(45) Date of Patent: May 29, 2007

(54) REINFORCED TANK

(75) Inventor: Georges Magyar, Dijon Cédex (FR)

(73) Assignee: Etablissements Magyar S.A. (FR)

( * ) Notice: Subject to any disclaimer, the term of this patent is extended or adjusted under 35 U.S.C. 154(b) by 0 days.

(21) Appl. No.: 10/434,876

(22) Filed: May 9, 2003

(65) Prior Publication Data

US 2003/0230583 A1 Dec. 18, 2003

(30) Foreign Application Priority Data

May 24, 2002 (FR) .................................. 02 06368

(51) Int. Cl.
*B60P 3/00* (2006.01)
*B62D 33/00* (2006.01)
*B65D 88/12* (2006.01)

(52) U.S. Cl. ........................................ 220/562; 220/651

(58) Field of Classification Search ................ 220/654, 220/4.12, 4.26, 562, 563, 565, 651; 280/837, 280/838
See application file for complete search history.

(56) References Cited

U.S. PATENT DOCUMENTS

| 1,815,625 | A | * | 7/1931 | Kramer | 280/837 |
| 1,886,197 | A | * | 11/1932 | Kramer | 280/837 |
| 2,078,939 | A | * | 5/1937 | Ferguson | 280/838 |
| 2,105,302 | A | | 1/1938 | Thwaits | |
| 2,160,477 | A | | 5/1939 | Kramer | |
| 2,163,387 | A | * | 6/1939 | Thwaits | 220/653 |
| 2,164,660 | A | * | 7/1939 | Miller | 220/654 |
| 2,192,593 | A | | 3/1940 | Bradley et al. | |
| 2,269,617 | A | | 1/1942 | Borstel | |
| 3,158,383 | A | * | 11/1964 | Anderson et al. | 280/837 |
| 4,251,005 | A | * | 2/1981 | Sons et al. | 220/563 |
| 6,464,094 | B2 | * | 10/2002 | Zacharias | 220/4.12 |

FOREIGN PATENT DOCUMENTS

EP 0 882 620 A1 12/1998

* cited by examiner

*Primary Examiner*—Anthony D. Stashick
*Assistant Examiner*—Harry Grosso
(74) *Attorney, Agent, or Firm*—DLA Piper US LLP

(57) ABSTRACT

The invention pertains to a tank having a partially cylindrical body extended by a cylindrical extension of smaller section by the intermediary of a tapered junction extension, and at least one internal reinforcement ring integral with the internal surface of the tubular part of smaller section.

2 Claims, 1 Drawing Sheet

SECTION A.A

REINFORCED TANK

RELATED APPLICATION

This application claims priority of French Patent Application No. 02/06368, filed May 24, 2002.

FIELD OF THE INVENTION

This invention pertains to the field of tanks, notably, but not exclusively, the field of tanks intended for highway, railroad, ship or air transport or storage tanks for liquids or powders used horizontally.

BACKGROUND

Tanks, particularly tanks that are transportable by means having different dimensions, usually have a cylindrical tank body providing the bulk of the useful volume. This tank body is extended in its front part by an extension of smaller section. Mobile tanks must be reinforced so as to resist the various handling operations without, however, this reinforcement increasing the tank's bulk.

It would therefore be advantageous to resolve this drawback by providing a reinforced tank with maximized capacity at given dimensions.

SUMMARY OF THE INVENTION

This invention relates to a tank including a partially substantially cylindrical body, a substantially cylindrical extension of smaller diameter than the substantially cylindrical body, a tapered junction extension, positioned between the body and the extension, and at least one internal reinforcement ring integral with an internal surface of the extension section.

BRIEF DESCRIPTION OF THE DRAWINGS

Better comprehension of the invention will be obtained from the description below which refers to a nonlimitative example of implementation with reference to the attached drawings in which.

DETAILED DESCRIPTION

Figure 1:
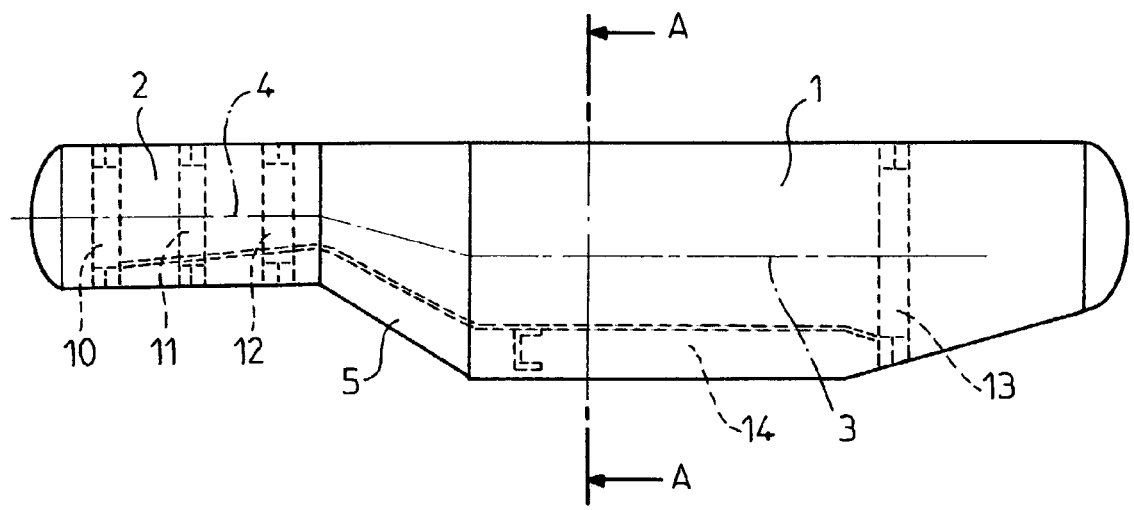
FIG. 1 is a side view of a tank according to aspects of the invention.
Figure 2:
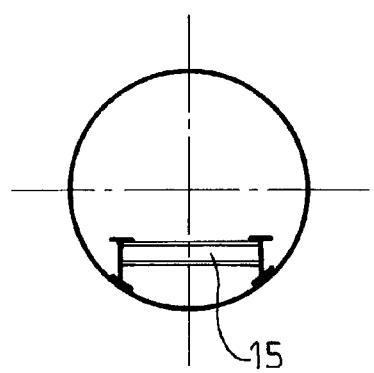
FIG. 2 is a detail view taken along the lines and arrows A—A.

It will be appreciated that the following description is intended to refer to specific embodiments of the invention selected for illustration in the drawings and is not intended to define or limit the invention, other than in the appended claims.

The invention in its broadest sense relates to a tank having a partially substantially cylindrical body extended by a substantially cylindrical extension of smaller section by the intermediary of a tapered junction extension, and at least one internal reinforcement ring integral with the internal surface of the tubular part of smaller section.

The tank advantageously comprises a multiplicity of internal reinforcement rings integral with the internal surface of the tubular part of smaller section. According to one particular variant, the tank furthermore comprises at least one longitudinal brace integral with the internal surface of the tank. According to another variant, the tank furthermore comprises at least one crosspiece integral with the brace.

FIG. 1 represents a side view of a semitrailer tank constituted of a substantially cylindrical tank body (1) having a section of about 2.5 m. This tank body is extended at its front part by a straight substantially cylindrical part (2) of smaller section, on the order of about 1 m.

The axis of symmetry (3) of the cylindrical body (1) is offset in relation to the axis of symmetry (4) of the cylindrical part (2). In the example shown in FIG. 1, the axis of symmetry (3) of the cylindrical body (1) is parallel to the axis of symmetry (4) of the cylindrical part (2), with the two axes being in a vertical plane and the axis of symmetry (4) of the cylindrical part (2) being offset upwards in relation to the axis of symmetry (3) of the cylindrical body (1).

This arrangement frees up space for hitching the trailer below the cylindrical part (2) of smaller section.

Part (2) is reinforced by three interior rings (10 to 13) welded on the interior surface of part (2). These rings have a circular or elliptical section complementary to that of part (2).

Braces (14) extend longitudinally and are welded on the rings (10 to 13). These braces (14) are constituted of metal profiles having a form complementary to that of the tank.

Crosspieces (15) are welded between the braces (14) to make the assembly more rigid.

The invention claimed is:

1. A tank comprising:
a partially substantially cylindrical body;
a substantially cylindrical extension of smaller diameter than the substantially cylindrical body;
a tapered junction extension positioned between the body and the extension; and
an internal reinforcement structure for providing tank reinforcement to the interior of the tank only with no exterior reinforcement means, the internal reinforcement structure comprising:
a plurality of internal reinforcement rings integral with an internal surface of the extension;
a longitudinal reinforcement brace connected to the internal surface of the extension and an internal surface of the body and extending generally along the internal surface of the extension, the internal surface of the junction extension and the internal surface of the body;
another longitudinal reinforcement brace extending substantially parallel to the longitudinal reinforcement brace and connected to the internal surfaces; and
at least one crosspiece connected between the longitudinal braces;
wherein the longitudinal reinforcement braces are welded on the internal reinforcement rings.

2. A tank comprising:
a partially substantially cylindrical body;
a substantially cylindrical extension of smaller diameter than the substantially cylindrical body;
a tapered junction extension positioned between the body and the extension;
a plurality of internal reinforcement rings integral with an internal surface of the extension; and
a longitudinal reinforcement brace connected to the internal surface of the extension and an internal surface of the body and extending forwardly and backwardly along a contour of the internal surface of the extension, an internal surface of the junction extension and the internal surface of the body,
wherein the reinforcement rings and longitudinal reinforcement brace provide interior tank reinforcement no exterior reinforcement means.

* * * * *